United States Patent [19]

Hehl

[11] Patent Number: 5,022,847
[45] Date of Patent: Jun. 11, 1991

[54] INJECTING UNIT FOR USE IN AN INJECTION MOLDING MACHINE

[76] Inventor: Karl Hehl, Arthur-Hehl-Strasse 32, D-7298 Lossburg 1, Fed. Rep. of Germany

[21] Appl. No.: 374,925

[22] Filed: Jul. 3, 1989

[30] Foreign Application Priority Data

Jul. 7, 1988 [DE] Fed. Rep. of Germany ....... 3822926

[51] Int. Cl.$^5$ ............................................. B29C 45/16
[52] U.S. Cl. .................................... 425/578; 264/75; 264/328.8; 425/257; 425/258; 425/583; 425/585
[58] Field of Search ....................... 222/318, 185, 162; 425/556, 578, 582, 580, 145, 583, 185, 585, 257, 258, 130, 575; 264/328.8, 73, 75

[56] References Cited

U.S. PATENT DOCUMENTS

| | | | |
|---|---|---|---|
| 4,118,168 | 10/1978 | Rees et al. | 425/556 |
| 4,251,204 | 2/1981 | Hehl | 425/582 |
| 4,418,845 | 12/1983 | Hehl | 222/162 |
| 4,629,410 | 12/1986 | Hehl | 425/145 |
| 4,731,005 | 3/1988 | Hehl | 425/185 |
| 4,865,534 | 9/1989 | Hehl | 425/575 |

FOREIGN PATENT DOCUMENTS

| | | |
|---|---|---|
| 7148839 | 9/1973 | Fed. Rep. of Germany. |
| 3046387 | 9/1982 | Fed. Rep. of Germany. |
| 2920584 | 11/1982 | Fed. Rep. of Germany. |
| 3228161 | 1/1984 | Fed. Rep. of Germany. |

Primary Examiner—Timothy Heitbrink
Attorney, Agent, or Firm—Spencer & Frank

[57] ABSTRACT

In an injecting unit of an injection molding machine, a feeding unit is mounted on a feeding block and serves to feed the material to be processed through a shaft into a plasticizing cylinder. The feeding unit is mounted on a carrier, which is slidably mounted on a track rail so that the feeding unit can be emptied into an emptying passage. The track rail extends along and is symmetrical to the vertical line of symmetry of the injecting unit. Owing to that arrangement the injecting unit is substantially symmetrical and when the feeding unit is in emptying position its center of gravity is disposed in the vertical plane of symmetry of the injecting unit or is close to said plane. Besides, the feeding unit can be moved approximately in said plane of symmetry to its emptying position.

9 Claims, 8 Drawing Sheets

INJECTING UNIT FOR USE IN AN INJECTION MOLDING MACHINE

BACKGROUND OF THE INVENTION

1. Field of the Invention

This invention relates to an injecting unit for use in an injection molding machine, which unit is movable by means of at least one actuating member toward a gate of an injection mold in said machine and comprises a plasticizing cylinder, at least one feeding unit, which is mounted on a feeding block associated with the elasticizing cylinder and is movable on a track rail of the feeding block from a feeding position, in which the plastic material flows from an outlet opening of the feeding unit through a feeding bore of the track rail and a shaft of the feeding block from above into the plasticizing cylinder, to an emptying position, in which the outlet opening of the feeding unit resisters with an emptying bore of the track rail, and at least one injecting member for axially displacing a plasticizing screw in the plasticizing cylinder.

2. Description of the Prior Art

Injecting units of that kind are known from FIG. 4 of DE 29 20 584 C2, from lines 21 to 29 of column 2 and lines 20 to 30 of column 4 of DE 30 46 387 C2 and from the corresponding passages of the corresponding U.S. Pat. No. 4,418,845, and from DE 32 28 161 and the corresponding U.S. Pat. application Ser. No. 518,126, now U.S. Pat. No. 4,629,410. In said known injecting units the track rail for guiding the feeding unit extends transversely to or beside the vertical longitudinal plane of symmetry of the injecting unit so that the emptying bore is outside the vertical projection surface of the injection unit and is thus readily accessible for the receipt of the plastic granules flowing down. But that advantage is afforded only at the expense of a considerable asymmetry of the injecting unit or a large lateral overhang of the feeding unit or of the emptying device. For this reason each of the injecting units disclosed in the printed publications mentioned hereinbefore necessarily involves a different spatial arrangement of the track rail relative to the plane of symmetry of the injecting unit.

Just as in the injecting units of the type described first hereinbefore, it is possible in the feeding unit of a known extruder (German Utility Model 71 48 839) to arrange the outlet opening of one or more hoppers in register with an emptying opening which is spaced from the plane of symmetry of the extruder.

SUMMARY OF THE INVENTION

In view of the prior art which has been discussed hereinbefore it is an object of the invention to provide an injecting unit which is of the kind described first hereinbefore and which permits of an economical series production and of a simplified storage of parts because the injecting unit can selectively be used together with different feeding units, which when in their emptying position have a center of gravity which is disposed in or close to the vertical plane of symmetry of the injecting unit and in which the feeding unit can be moved to its discharge position approximately in the plane of symmetry even when the feeding block, actuating cylinders and injecting cylinders are provided in widely varying designs and arrangements.

That object is accomplished in accordance with the invention in that the track rail extends longitudinally along the vertical longitudinal plane of symmetry of the injecting unit, the emptying bore is approximately symmetrical to the vertical longitudinal plane of symmetry of the injecting unit, an emptying duct is provided, which receives the plastic material from the emptying bore and has an outlet opening that is spaced from said plane of symmetry, and the feeding unit which is slidably mounted on the track rail selectively consists of a hopper provided with a base body or of a granule changer provided with a carrying body, which has a slide rail that is at right angles to said plane of symmetry and a slide plate, which is slidable on said slide rail and connected to a plurality of flexible feeding tubes for selectively feeding different plastic materials.

In injecting units of various types, the teaching of the invention may be embodied with feeding units of widely different types. It will afford special advantages where feeding blocks having a large lateral overhang are used and also affords the important advantage that in a modular assembly a hopper (see FIG. 2 of DE 30 46 387 or of U.S. Pat. No. 4,418,845) or a granule changer (see DE 36 05 219 A1 or U.S. Pat. 4,731,005) can selectively be guided by the track rail in the plane of symmetry if the same connecting fittings are provided.

The teaching in accordance with the invention is of special importance with injecting units as disclosed in German Patent application P No. 37 22 228 or the corresponding U.S. Pat. No. 4,865,534. Such an injecting unit is adapted to be displaced from a central injecting position for injecting into a central gate to an axially parallel, off-center injecting position for injecting into an off-center gate. Whereas the lateral displacement of such injecting unit to an off-center position will result in an asymmetry, the displacement of the slide plate of the granule changer to an emptying opening disposed near the free end of the track rail will not result in an additional asymmetry.

Special embodiments of the invention have the following features:

The feeding block is provided with two actuating cylinders and two injecting cylinders which extend through said block, which is guided by the piston rods of the actuating cylinders. The actuating cylinders and the injecting cylinders are symmetrical with respect to respective planes, which include an angle of about 45° to each other. The emptying duct extends between an actuating cylinder and an injecting cylinder.

In its feeding position, the hopper or the granule changer is adapted to be locked in engagement with a stop member that is detachably mounted on the track rail. In its emptying position and in an intermediate shut-off position the hopper or the granule changer engages an associated detent nose of a detent lever, which is mounted in the track rail for a limited pivotal movement, and said hopper or granule changer is adapted to be locked in said discharge and shut off positions by clamping means.

The emptying duct has an inclined chute wall, which is closely spaced from the adjacent injecting piston as said piston is extended from the associated injecting cylinder.

The track rail is mounted on a horizontal surface of a projecting portion, which is rectangular in a top plan view and integral with a parallel epipedic central portion of the feeding block. The feeding block has two lateral wing portions, each of which contains an actuating cylinder and an injecting cylinder and which have a smaller axial depth than said central portion.

In such embodiments of the feeding block the track rail may be extremely short. This will be desirable during a release and removal of the plasticizing cylinder of an injecting unit that is provided with means for automatically changing the plasticizing cylinder.

DETAILED DESCRIPTION OF THE PREFERRED EMBODIMENT

The invention will now be explained with reference to the drawing.

Figure 1:
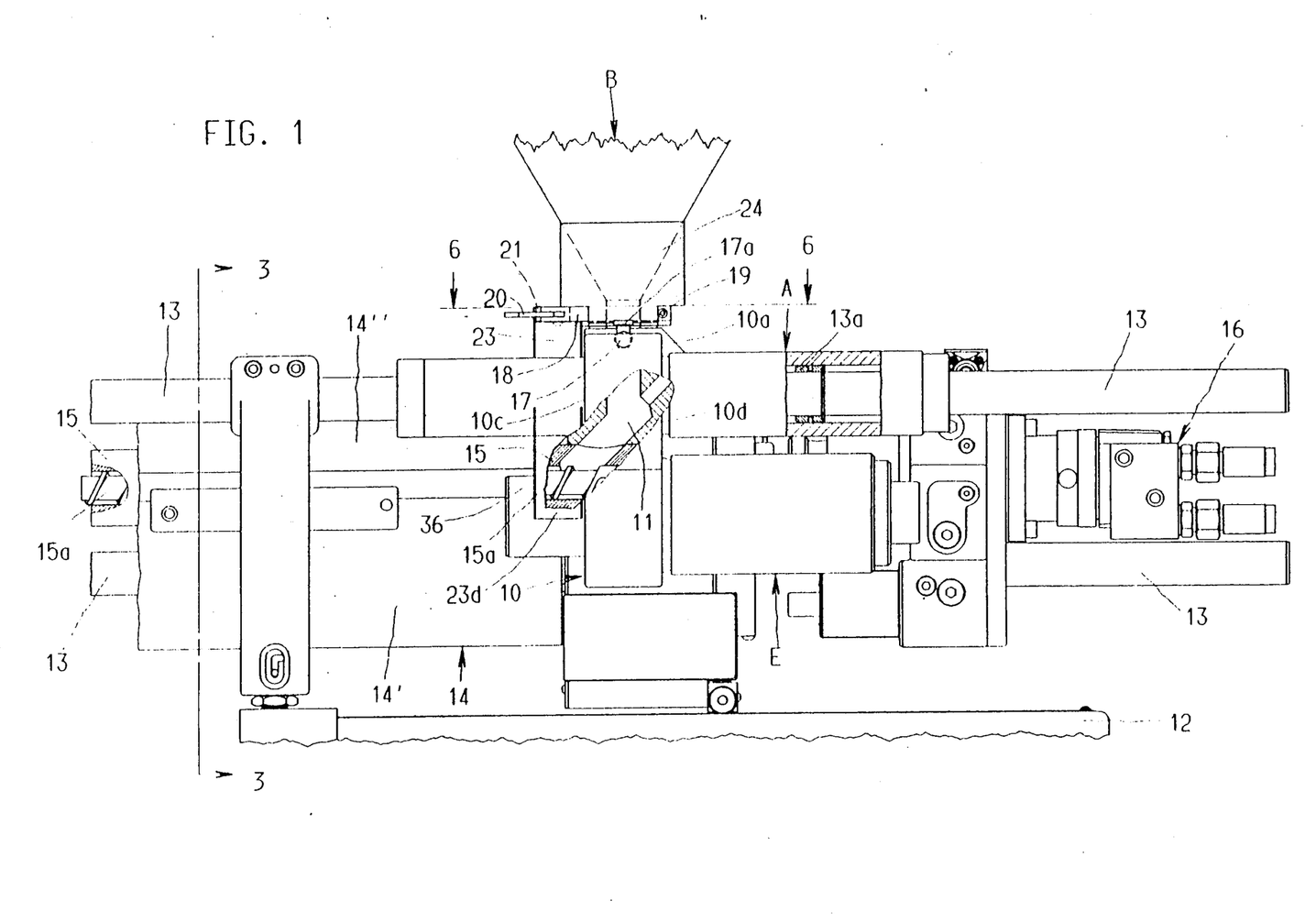
FIGS. 1 and 2 are side elevations showing an injecting unit provided with different feeding devices.
Figure 2:
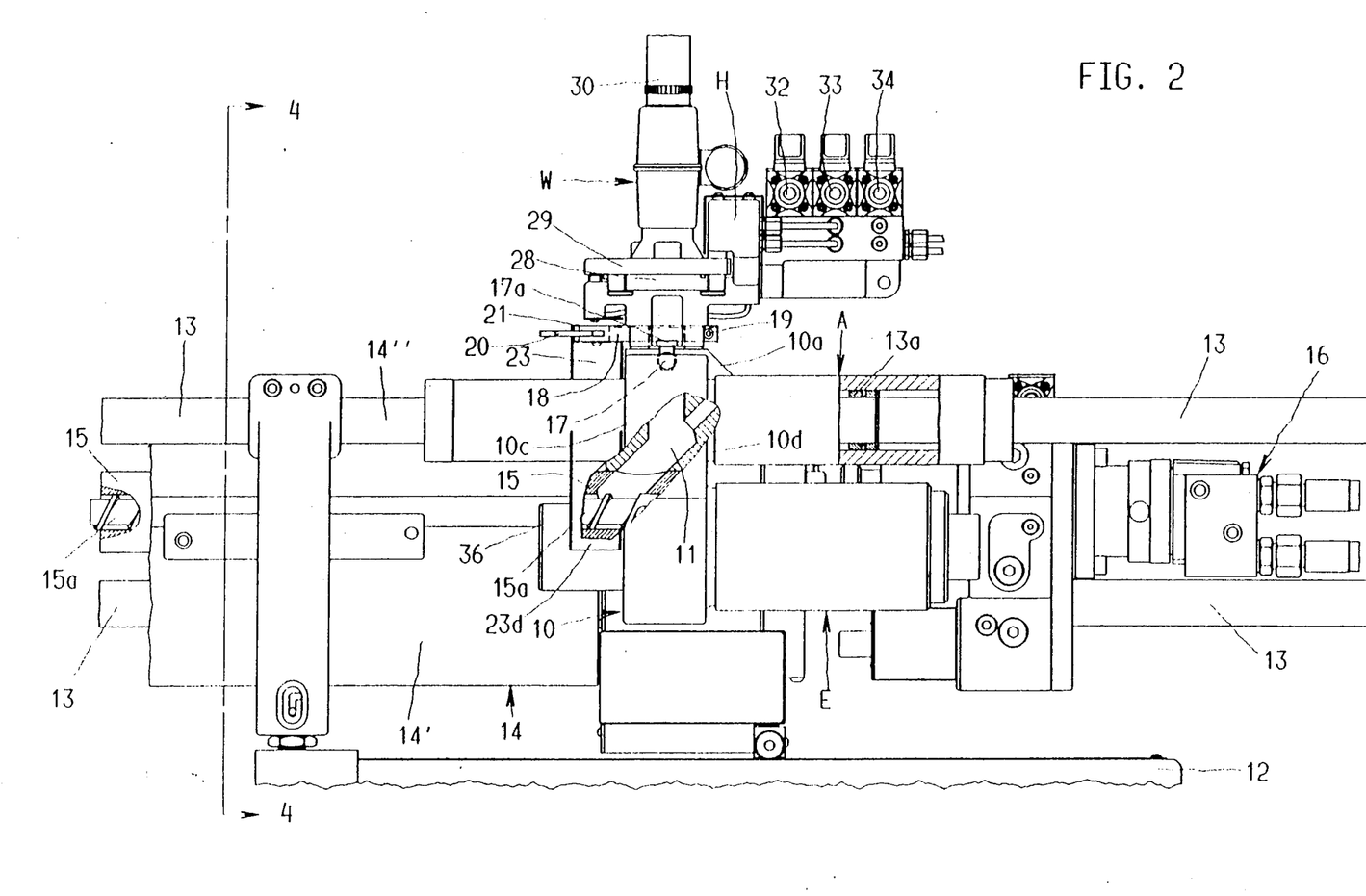
Figure 3:
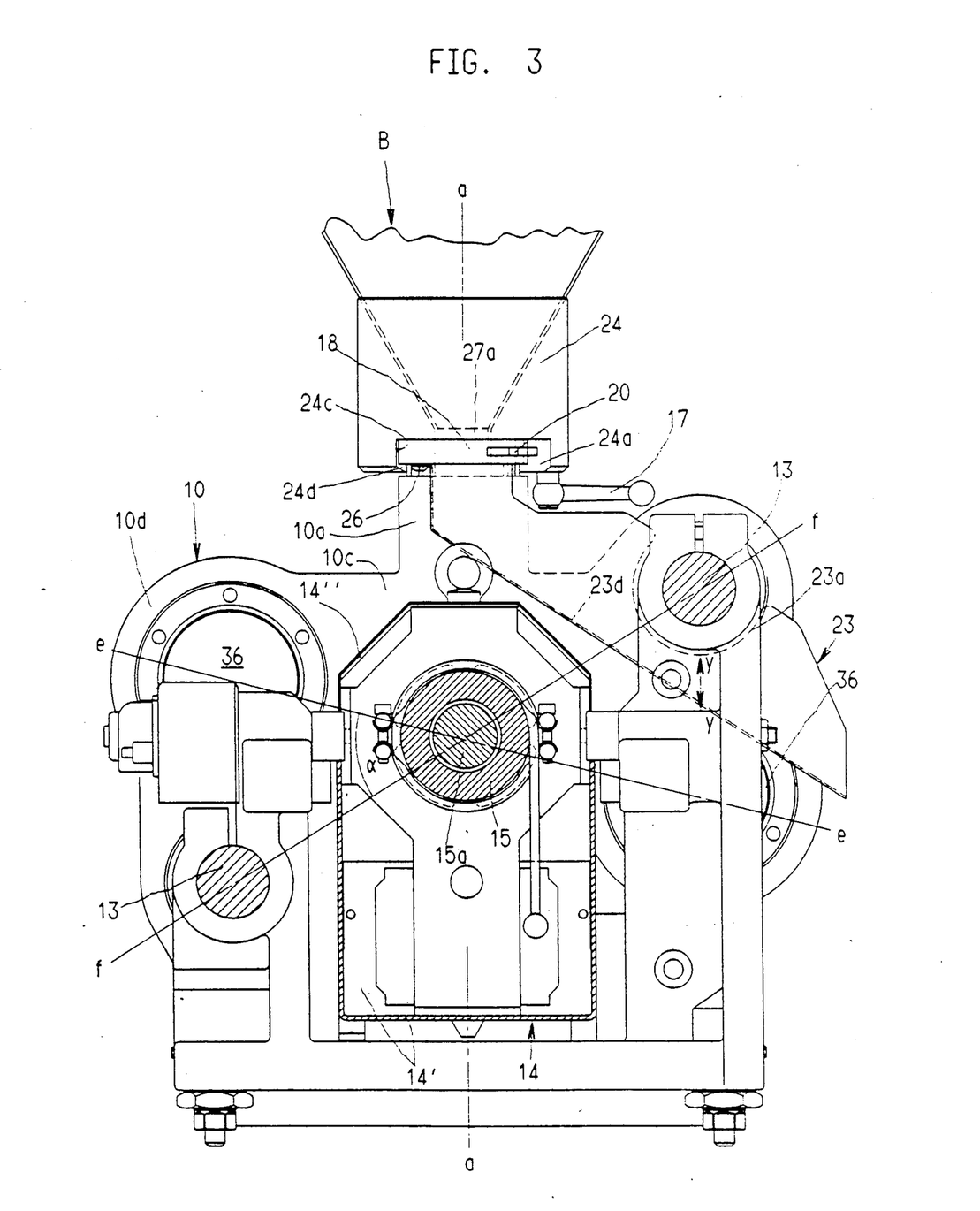
FIG. 3 is a enlarged sectional view taken on line III-III in FIG. 1.
Figure 4:
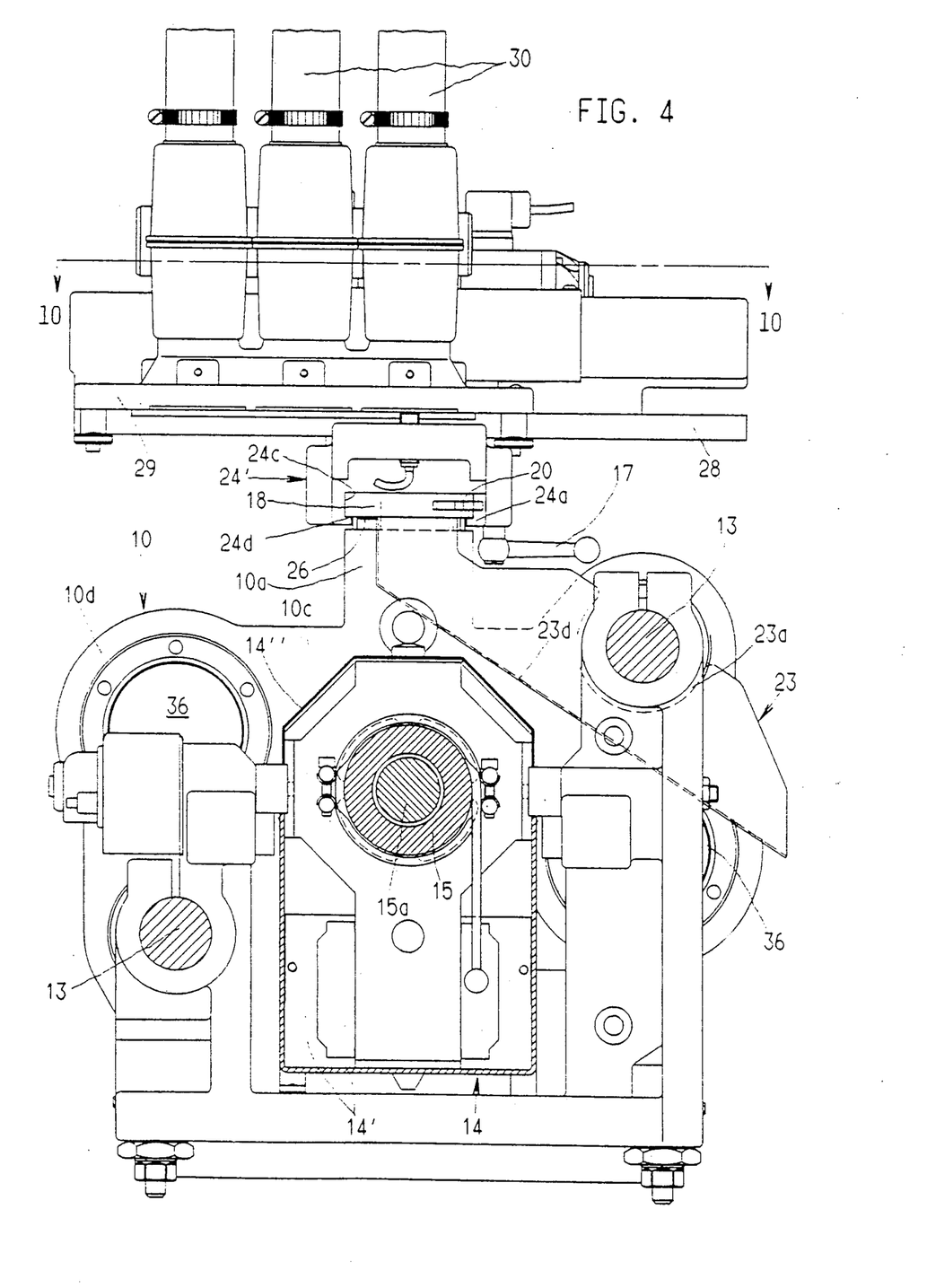
FIG. 4 is an enlarged sectional view taken on line IV-IV in FIG. 2.
Figure 5:
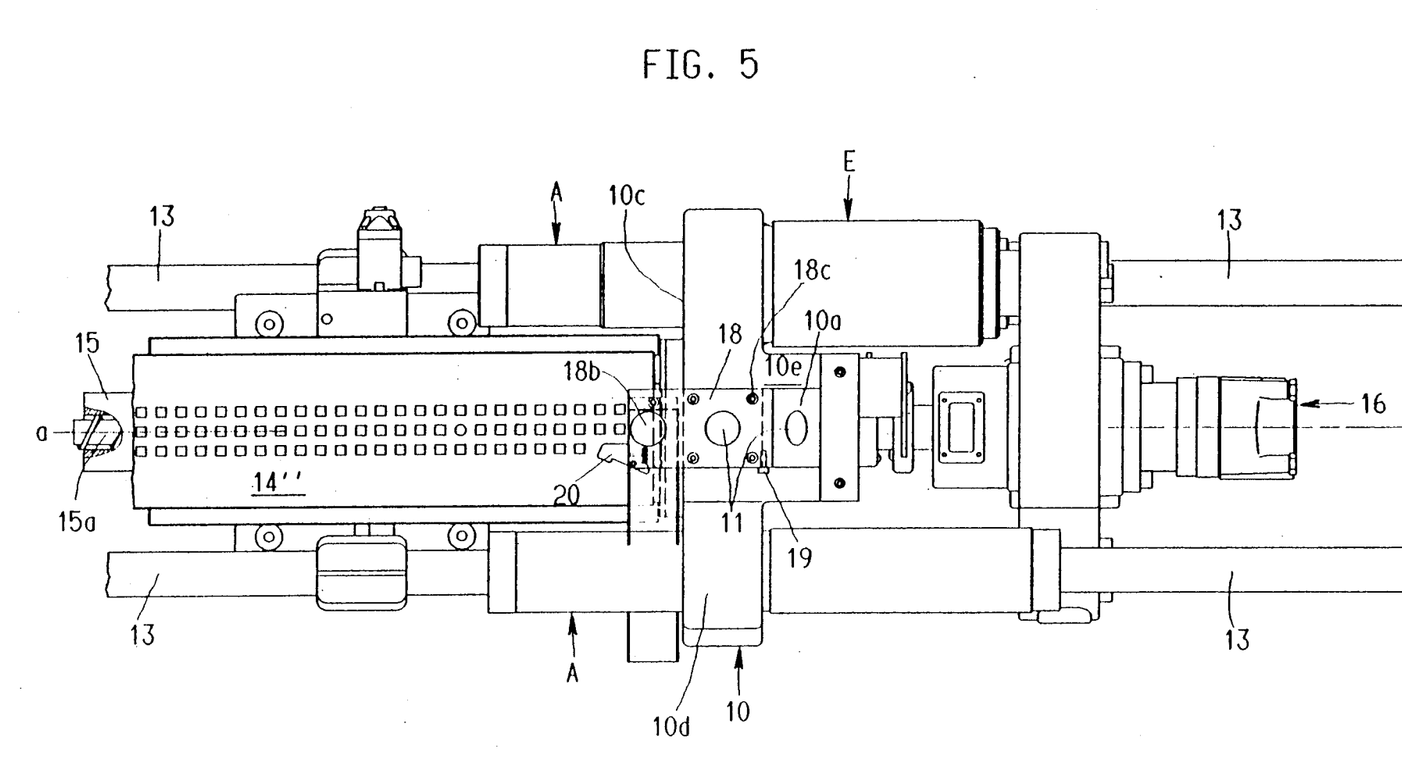
FIG. 5 is a top plan view showing the injecting unit of FIG 1. When the feeding unit has been removed.

An injecting unit of an injection molding machine is supported on a deck 12 of said machine and by actuating means A is movable toward the gate of an injection mold of the machine. The rear end of the plasticizing cylinder 15 is received in a central bore of a feeding block 10. The actuating means A comprise actuating cylinders and associated pistons 13a, which are mounted in the feeding block 10. The feeding unit B or W, which is adapted to be mounted on the feeding block 10 and serves to supply plastic granules, may selectively consist of various feeding devices. In the illustrative embodiment shown in the drawing, said feeding devices consist of a hopper B (FIGS. 1, 3) and of a granule changer W (FIGS. 2, 4). All feeding units B and W may be connected to the feeding block 10 by the same connecting means. The feeding unit is mounted on a carrying element, which may consist of a main body 24 or of a carrier 24'. The feeding unit B or W is slidably mounted on a track rail, which is mounted on a mounting surface of the feeding block 10. The feeding unit B or W is adapted to be fixed in different positions on the track rail 18. When the feeding unit is in its feeding position shown in FIG. 6, the plastic material flows from the outlet opening 27a of the feeding unit B or W through a feeding bore 18a of the track rail 18 and the shaft 11 of the feeding block 10 into the plasticizing cylinder 15. In the emptying position shown in FIG. 8 the outlet opening 27a of the feeding unit and an emptying bore 18b of the track rail 18 are in register. The injecting unit also comprises injecting means consisting of two injecting cylinders E for axially displacing the plasticizing screw 15a, which is mounted in the plasticizing cylinder 15 for rotation about its axis by a rotary motor 16. The plasticizing cylinder 15 is covered by a protective housing 14, which consists of two housing halves 14', 14".

The track rail 18 extends along the vertical longitudinal plane of symmetry a-a of the injecting unit and is symmetrical with respect to said plane and protrudes beyond a vertical end face 10c of the feeding block 10. The emptying bore 18b is formed in that protruding portion of the rail 18 and is approximately symmetrical to the plane of symmetry a-a. An emptying duct 23 extends transversely to the plane of symmetry a-a and has a bottom chute wall, which is sufficiently downwardly inclined to permit the granules to slip by gravity. The emptying duct 23 has a vertical side face 23c in contact with the feeding block 10. The emptying duct 23 has an inlet opening that is disposed under the emptying bore 18b.

Two actuating cylinders A and the two injecting cylinders E extend through the feeding block 10, which is guided on the piston rods 13 of the actuating cylinders A. The actuating cylinders A are symmetrical to the axis of the plasticizing cylinder 15. The emptying duct 23 extends between an actuating cylinder A and an adjacent injecting cylinder E. Stamped circular edges 23a of the side walls 23b, 23c of the emptying duct engage the peripheral surface of the actuating cylinder A.

Figures 6, 7, 8:
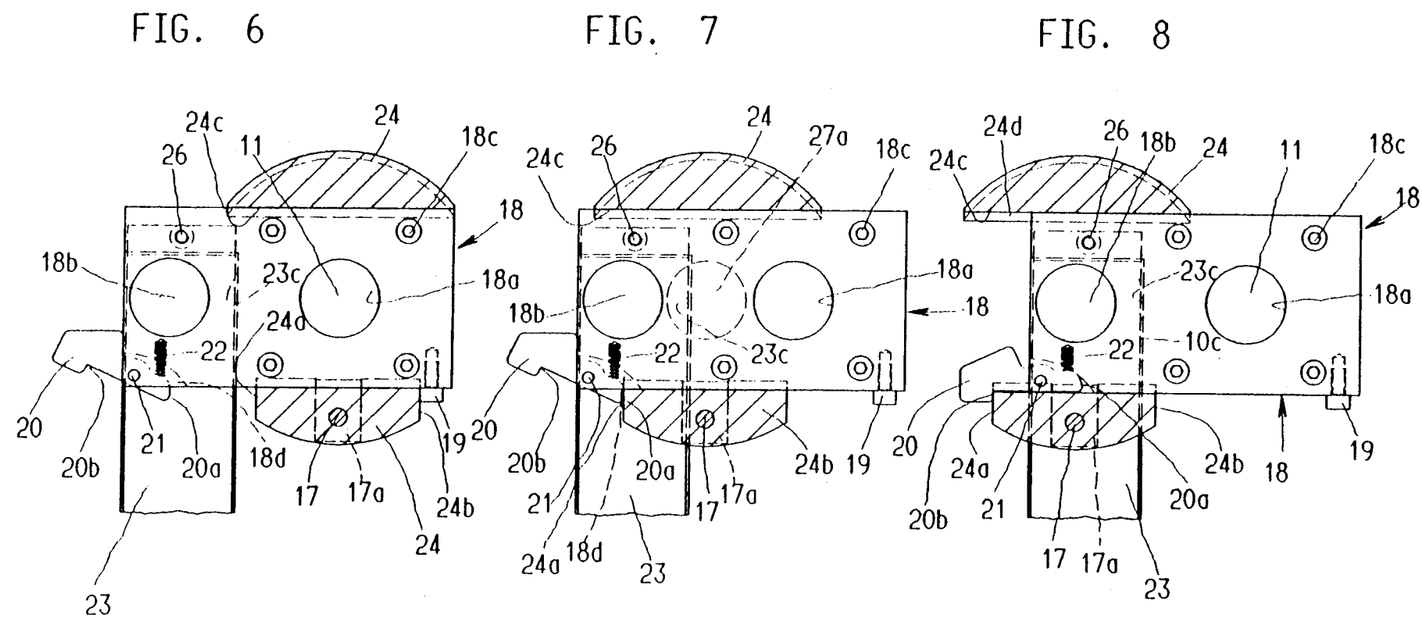
FIG. 6 is a sectional view taken on line VI-VI in FIG. 1 and showing the track rail and the feeding unit connected thereto.
FIGS. 7 and 8 show the same assembly as FIG. 6 with the feeding unit in other positions.

When the feeding unit B or W is in one end position, namely, its feeding position shown in FIG. 6, the stop surface 24b of the carrier 24 or 24' of the feeding unit engages a stop member 19, which is detachably mounted on the track rail 18. When the feeding unit B or W is in its other end position, namely, the emptying position shown in FIG. 8, and in an intermediate position, namely, a shut-off position shown in FIG. 7, the carrier 24 or 24' engages one of the detent noses 20b and 20a of a detent lever 20, which is mounted for a limited pivotal movement on a pivot pin 21 mounted in the track rail. In the emptying and shut-off positions the carrier 24 or 24' is adapted to be locked by a clamping member 17a as a result of a slight clamping movement of a clamping device 17. When the carrier 24 or 24' is to be moved from its shut-off position, in which the stop face 24a of the carrier 24, 24' engages the detent nose 20a of the detent lever, to its emptying position, the detent lever must be moved against the force of a spring 22. The feeding unit B or W can subsequently be moved until the stop surface 24a of the carrier 24 or 24' engages the detent nose 20b of the detent lever 20. This will ensure that the feeding unit B or W will not inadvertently be emptied. As the feeding unit B or W departs from the emptying position shown in FIG. 8, the detent lever 20 is returned to its initial position by spring force. To provide that freedom of movement for the detent lever, the track rail 18 is formed with an aperture 18d. The carrying body 24, of the granule changer W carries a slide rail 28, which extends at right angles to the plane of symmetry a-a and on which a slide plate 29 is slidably mounted, which is actuated by hydraulic actuating cylinders H. The actuating cylinders H are in part movable and in part stationary and are controlled by control valves 33, 34. Under the control of limit switches, a further control valve 32 controls a shut-off sliding valve for opening and closing feed openings formed in the slide plate 29. A plurality of flexible feeding tubes 30 for feeding different plastic materials are connected to the slide plate 28. The slide plate 29 is movable by the actuating cylinders H at right angles to the plane of symmetry a-a to selectively move each of said feeding tubes 30 into register with the outlet opening 27a of the feeding unit W. The latter is movable along said plane of symmetry a-a to selectively move said discharge opening 27a into register with the feeding opening 18a and with the emptying opening 18b of the track rail 18.

Figures 10, 11:
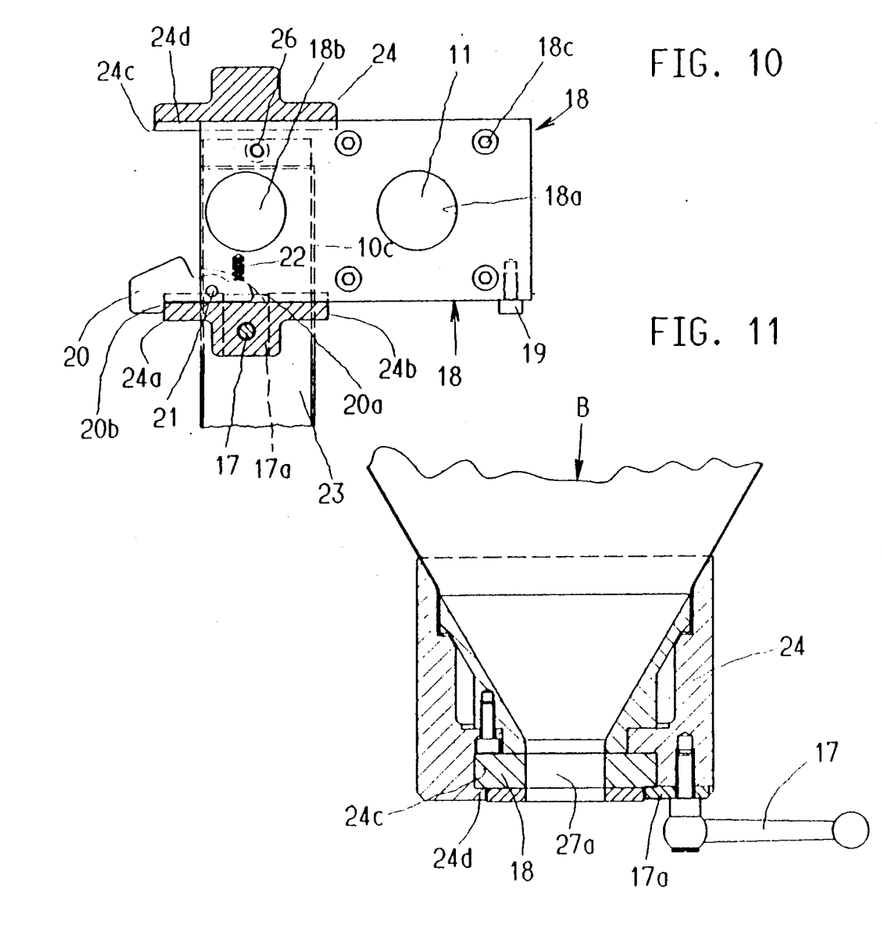
FIG. 10 is a sectional view taken on line X-X in FIG. 4.
FIG. 11 is an enlarged, partly sectional view showing a portion of FIG. 3.

Because the stop member 19 can selectively be removed from and mounted on the track rail 18, the base body 24 of the hopper B or the carrying body 24' of the granule changer W can selectively be slidably mounted on and removed from the track rail 18. Each of the carriers 24 and 24' has stop faces 24a and 24b, which are engageable with the detent noses 20a and 20b or with the stop member 19. The carrier 24 or 24' is held on the feeding block 10 by guides 24c and bottom projections 24d. Upon a comparison of FIGS. 8 and 10 it becomes apparent that the carriers 24 and 24' differ in their geometric configuration but have the same stop surfaces 24a and 24b, the same guide 24c and the same bottom projections 24d.

The distance y-y between each of the injecting pistons 36, which protrude from the end face 10c of the feeding block 10, and the adjacent actuating cylinders A is approximately as large as the inside diameter of the emptying bore 18b. The actuating cylinders A and the injecting cylinders E are symmetrically disposed with reference to respective planes f-f and e-e, which include an angle of about 45° with each other (FIG. 3).

The bottom chute wall 23d of the emptying duct 23 is closely spaced from the adjacent injecting piston 36 so that the piston 36 is not restrained as it extends from the associated injecting cylinder E. The emptying duct 23 is connected by a screw 26 to the track rail 18.

Figure 12:
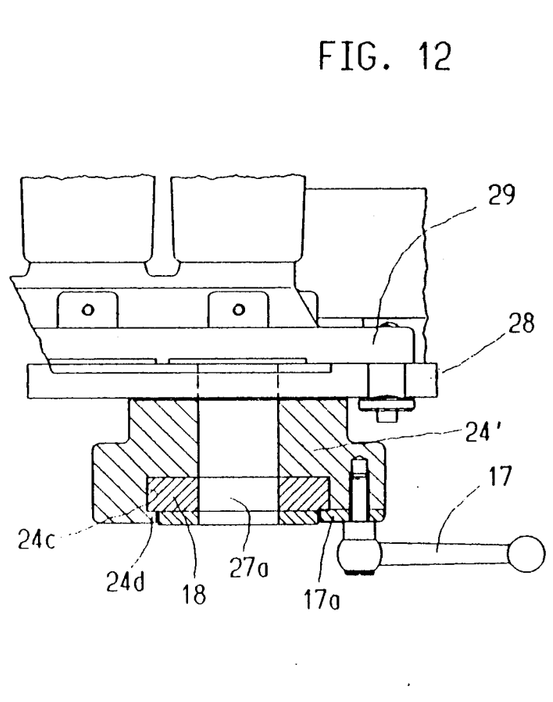
FIG. 12 is an enlarged partly sectional view showing a portion of FIG. 4.

The track rail 18 is mounted on the horizontal top surface of a projection 10a of a parallelepipedic central portion 10e of the feeding block. That projection 10a is rectangular in a top plan view. The feeding block 10 is also provided with two lateral wing portions 10d, which have a smaller axial depth t-t than the central portion 10e (FIG. 12). An actuating cylinder A and an injecting cylinder E extend through each of said wing portions 10d.

Figure 9:
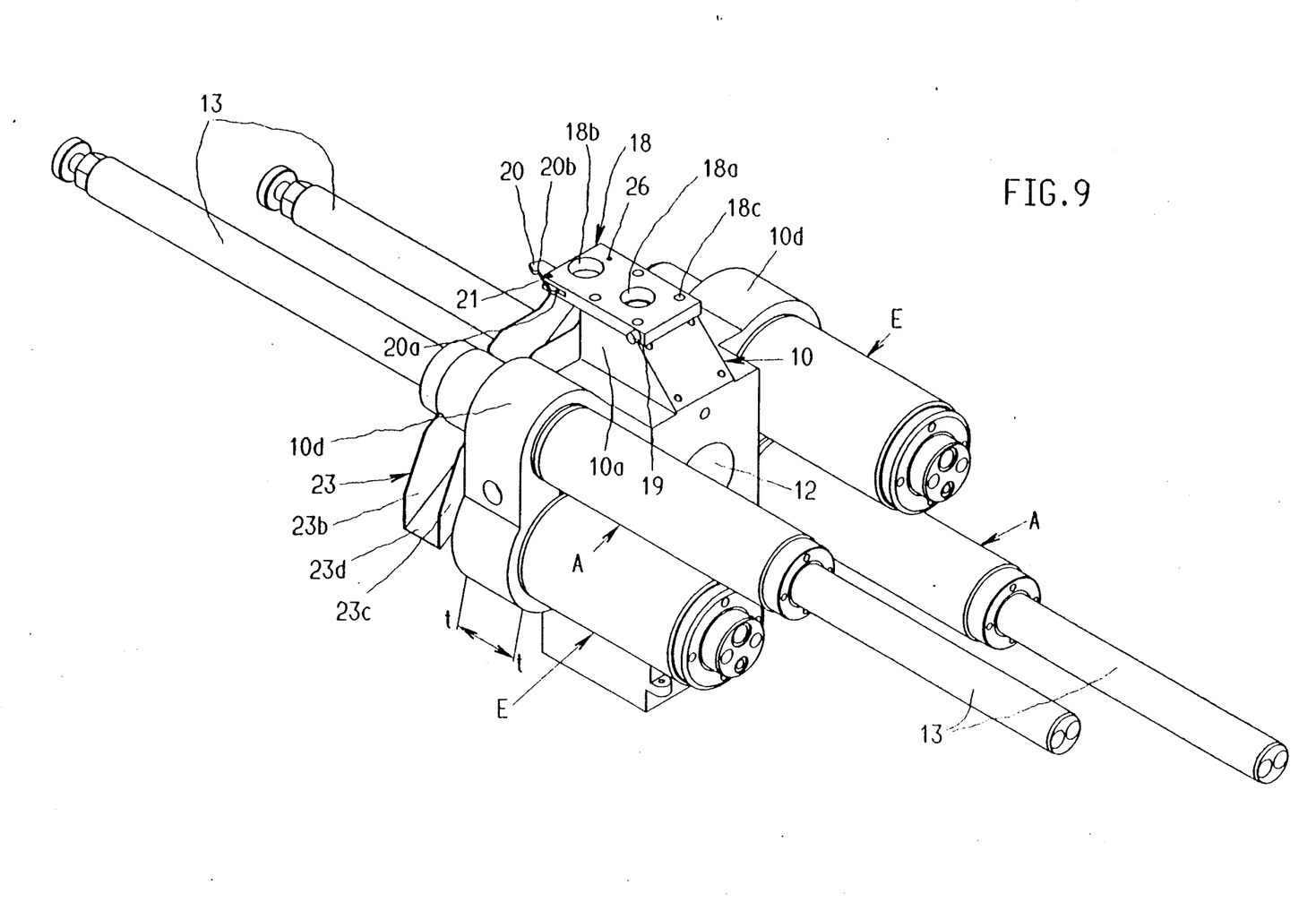
FIG. 9 is a perspective view showing the feeding block and the associated actuating and injecting cylinders.

FIG. 9 shows the feeding block 10 and the track rail 18 mounted thereon but without a feeding unit B or W mounted on the track rail. The stop member 19, the detent lever 20 provided with the two detent noses 20a, 20b and the feeding bore 18a and the emptying bore 18b in the track rail 18 are clearly apparent. The track rail 18 is secured to the feeding block 10 by screws 18c.

I claim:
1. In an injecting unit for an injection molding machine; said injecting unit having
    a vertical longitudinal plane of symmetry;
    a feeding block;
    a plasticizing cylinder passing through said feeding block;
    a feeding shaft formed in said feeding block and communicating with the plasticizing cylinder;
    a track rail mounted on the feeding block and having a feeding bore being in alignment with an inlet of the feeding shaft and an emptying bore spaced from the feeding bore;
    a feeding unit mounted on the track rail for displacement therealong; said feeding unit having an outlet opening; the feeding unit being movable on the track rail into a feeding position in which the outlet opening is in alignment with the feeding bore,
    whereby plastic material is dischargeable from the feeding unit through the feeding bore and feeding shaft into the plasticizing cylinder; the feeding unit being movable on the track rail into an emptying position in which the outlet opening is in alignment with the emptying bore, whereby plastic material may be emptied from the feeding unit through the emptying bore;
    the improvement wherein said track rail extends along and symmetrically with said vertical longitudinal plane of symmetry, wherein said emptying bore is situated at least approximately symmetrically with said vertical longitudinal plane of symmetry;
    the improvement further comprising an emptying duct having an inlet opening communicating with said emptying bore and an outlet situated at a distance from said vertical longitudinal plane of symmetry, whereby plastic material is dischargeable from said feeding unit through said emptying duct when said feeding unit is in said emptying position; and
    a carrier forming part of and supporting said feeding unit; said carrier being readily detachably mounted on said track rail.

2. The injecting unit as set forth in claim 1, wherein said feeding unit comprises a hopper having a base body; said base body constituting said carrier.

3. The injecting unit as set forth in claim 1, wherein said feeding unit comprises a granule changer having a slide rail mounted on said carrier and extending at right angles to said plane of symmetry, a slide plate slidable on said slide rail and a plurality of feeding tubes connected to said slide plate and adapted to feed different plastic materials, and
    said slide being movable on said slide rail to a plurality of positions in which respective ones of said feeding tubes communicate with said outlet opening of said feeding unit.

4. The injecting unit as set forth in claim 3, wherein each of said feeding tubes is adapted to communicate through said outlet opening with said feeding bore when said feeding unit is in said feeding position and with said emptying bore when said feeding unit is in said emptying position.

5. The injecting unit as set forth in claim 1, wherein said emptying duct constitutes a chute and is associated with said feeding block and extends transversely to said plane of symmetry.

6. The injecting unit as set forth in claim 1, wherein said track rail has a detachably mounted stop member,
    a detent lever mounted in said track rail for a limited pivotal movement; said detent lever being provided with first and second detent noses,
    said carrier being arranged to engage said stop member when said feeding unit is in said feeding position and to engage said first detent nose when said feeding unit is in said emptying position,
    said feeding unit being movable to a shut-off position between said feeding and emptying positions,
    said carrier being arranged to engage said second detent nose when said feeding unit is in said shut-off position, and
    clamping means for locking said carrier in each of said feeding, emptying and shut-off positions.

7. An injecting unit as defined in claim 1, in combination with an injection molding machine encompassing the injecting unit;
  said plasticizing cylinder having a longitudinal axis oriented parallel to said plane of symmetry;
  said injecting unit further including a plasticizing screw received coaxially in said plasticizing cylinder for rotation about said axis; said plasticizing screw being axially linearly displaceable in and relative to said plasticizing cylinder;
  said injection molding machine including
  means for supporting said injecting unit for back-and-forth displacement parallel to said plane of symmetry;
  actuating means for effecting said back-and-forth displacement of said injecting unit; said actuating means comprising two actuating cylinders extending through said feeding block and being arranged symmetrically to a first plane; each actuating cylinder receiving respective piston rods; said piston rods being arranged to guide said feeding block;
  injecting means for axially displacing said plasticizing screw in said plasticizing cylinder; said injecting means comprising two injecting cylinders extending through said feeding block and being arranged symmetrically to a second plane; said first and second planes being arranged at an angle of about 45° to one another;
  further wherein said emptying duct extends between one of said actuating cylinders and an adjacent one of said injecting cylinders.

8. An injecting unit as defined in claim 1, in combination with an injection molding machine encompassing the injecting unit;
  said plasticizing cylinder having a longitudinal axis oriented parallel to said plane of symmetry;
  said injecting unit including a plasticizing screw received coaxially in said plasticizing cylinder for rotation about said axis; said plasticizing screw being axially linearly displaceable in and relative to said plasticizing cylinder;
  said injection molding machine including
  means for supporting said injecting unit for back-and-forth displacement parallel to said plane of symmetry;
  actuating means for effecting said back-and-forth displacement of said injecting unit;
  injecting means for axially displacing said plasticizing screw in said plasticizing cylinder; said injecting means comprising at least one injecting cylinder extending through said feeding block and an injecting piston displaceable in and extensible from said injecting cylinder;
  further wherein said emptying duct has an inclined bottom wall arranged closely spaced from said injecting piston when extended from said injecting cylinder.

9. An injecting unit as defined in claim 1, in combination with an injection molding machine encompassing the injecting unit;
  said plasticizing cylinder having a longitudinal axis oriented parallel to said plane of symmetry;
  said injecting unit including a plasticizing screw received coaxially in said plasticizing cylinder for rotation about said axis; said plasticizing screw being axially linearly displaceable in and relative to said plasticizing cylinder;
  said injection molding machine including
  means for supporting said injecting unit for back-and-forth displacement parallel to said plane of symmetry;
  actuating means for effecting said back-and-forth displacement of said injecting unit; said actuating means comprising two actuating cylinders;
  injecting means for axially displacing said plasticizing screw in said plasticizing cylinder; said injecting means comprising two injecting cylinders;
  further wherein said feeding block has a parallelepipedic central portion and two wing portions extending laterally from said central portion on opposite sides thereof and having a smaller axial extent than said central portion;
  one of said actuating cylinders and one of said injecting cylinders extending through each of said wing portions;
  said central portion being integrally formed with a projection, said projection being rectangular in a top plan view and having a horizontal top surface; and
  said track rail being mounted on said top surface.

* * * * *